United States Patent
Hunt et al.

(10) Patent No.: US 6,950,101 B2
(45) Date of Patent: Sep. 27, 2005

(54) COMPUTER IMPLEMENTED METHOD AND SYSTEM FOR TRANSMITTING GRAPHICAL IMAGES FROM SERVER TO CLIENT AT USER SELECTABLE RESOLUTION

(75) Inventors: William J. Hunt, Walnut Creek, CA (US); Edward James Neil, Redwood City, CA (US); Steven F. Haber, Danville, CA (US); Russell D. Wood, Martinez, CA (US)

(73) Assignee: Research Investment Network, Inc., Irvine, CA (US)

( * ) Notice: Subject to any disclaimer, the term of this patent is extended or adjusted under 35 U.S.C. 154(b) by 269 days.

(21) Appl. No.: 10/248,175

(22) Filed: Dec. 23, 2002

(65) Prior Publication Data

US 2003/0072299 A1 Apr. 17, 2003

Related U.S. Application Data

(63) Continuation of application No. 09/036,268, filed on Mar. 6, 1998, now Pat. No. 6,501,472, which is a continuation of application No. 08/622,528, filed on Mar. 25, 1996, now Pat. No. 5,764,235.

(51) Int. Cl.[7] .............................................. G06T 17/00
(52) U.S. Cl. ..................................................... 345/428
(58) Field of Search ......................................... 345/428

(56) References Cited

U.S. PATENT DOCUMENTS

| 4,969,204 A | 11/1990 | Melnychuck et al. ....... 382/240 |
| 5,048,111 A | 9/1991 | Jones et al. ................. 382/248 |
| 5,153,936 A | * 10/1992 | Morris et al. ............... 345/428 |
| 5,159,592 A | 10/1992 | Perkins ....................... 370/85.7 |
| 5,214,519 A | 5/1993 | Faulhaber et al. .......... 358/451 |
| 5,218,455 A | 6/1993 | Kristy ......................... 358/403 |
| 5,239,625 A | 8/1993 | Bogart et al. ............... 345/428 |
| 5,263,136 A | 11/1993 | DeAguiar et al. .......... 345/511 |
| 5,274,794 A | 12/1993 | Ewing et al. ................ 345/428 |
| 5,315,693 A | * 5/1994 | Hirosawa ..................... 345/428 |
| 5,373,375 A | 12/1994 | Weldy ......................... 358/523 |
| 5,392,133 A | 2/1995 | Nakajima .................... 358/407 |
| 5,392,223 A | 2/1995 | Caci ............................ 709/218 |
| 5,420,967 A | 5/1995 | Delp ........................... 345/435 |
| 5,440,401 A | 8/1995 | Parulski et al. ............. 386/124 |
| 5,442,749 A | 8/1995 | Northcutt et al. ........... 709/219 |
| 5,446,736 A | 8/1995 | Gleeson et al. .......... 370/85.13 |
| 5,657,345 A | 8/1997 | Lazaridis .................... 375/222 |
| 5,699,170 A | 12/1997 | Yokose et al. .............. 358/426 |
| 5,717,737 A | 2/1998 | Doviak et al. ................ 379/58 |
| 5,742,762 A | 4/1998 | Scholl et al. ............ 395/200.3 |

(Continued)

FOREIGN PATENT DOCUMENTS

| JP | 6-78126 | 3/1994 |
| JP | 7-66913 | 3/1995 |
| WO | WO9422101 | 9/1994 |

OTHER PUBLICATIONS

"NCSA Mosaic Technical Summary", Adreeessen, May 1993.*

(Continued)

Primary Examiner—Jeffrey A. Brun
Assistant Examiner—Jon Hadidi
(74) Attorney, Agent, or Firm—Steve A. Wong

(57) ABSTRACT

Techniques for transmitting graphical images in a network environment are described. According to the techniques, the amount of data of the graphical images that is transmited is customized in accordance with client and/or server supplied information. The techniques enable graphical images to be transmitted more efficiently than previously possible, thus saving precious network bandwidth and reducing transmision time. The invention is particularly suitable for network (Internet or Internet) implementations wherein graphical images often need transferred.

30 Claims, 11 Drawing Sheets

U.S. PATENT DOCUMENTS

| | | | | |
|---|---|---|---|---|
| 5,761,425 A | | 6/1998 | Miller | 395/200.48 |
| 5,768,535 A | * | 6/1998 | Chaddha et al. | 709/247 |
| 5,790,708 A | | 8/1998 | Delean | 382/270 |
| 5,821,986 A | * | 10/1998 | Yuan et al. | 348/14.12 |
| 5,864,683 A | | 1/1999 | Boebert et al. | 395/200.79 |
| 5,907,640 A | | 5/1999 | Delean | 382/276 |
| 5,918,018 A | | 6/1999 | Gooderum et al. | 395/200.55 |
| 5,963,966 A | * | 10/1999 | Mitchell et al. | 715/513 |
| 6,332,146 B1 | * | 12/2001 | Jebens et al. | 707/104.1 |
| 6,430,161 B2 | * | 8/2002 | Uemura et al. | 370/252 |

OTHER PUBLICATIONS

"Mosaic—Surfing at Home and Abroad", Baker, 1994.*

"Mosaic and the World–Wide Web", Vetter, 1994.*

Anderson et al., "Toolkit support for multiuser audio/video applications," Computer Communications, vol. 15, No. 6, pp. 403–408 (Jul./Aug. 1992).

Waldin, PhD Thesis "Using Multiple Representations for Efficient Communication of Abstract Values," Massachusetts Institute of Technology, (Sep. 1992).

Campbell et al., "Integrated Quality Of Service For Multimedia Communications," IEEE Infocom'93, Proc. vol. 2, pp. 732–739 (1993).

Yamazaki, et al., "ATM Networking and Video–Coding Techniques for QOS Control in B–ISDN," *IEEE Transactions On Circuits And Systems For Video Technology*, vol. 3, No. 3, pp. 175–181 (Jun. 1993).

Eleftheriadis, et al., "Algorithms and Performance Evaluation of the Xphone Multimedia Communication Systems," Proc. ACM Multimedia, pp. 311–320 (1993).

Elliott, "High–Quality Multimedia Conferencing Through a Long–Haul Packet Network," Proc. ACM Multimedia pp. 91–98 (1993).

Delgrossi et al., "Media Scaling for Audiovisual Communication with the Heidelberg Transport System," ACM Multimedia, pp. 99–104 (1993).

Jäger, et al. "Building a Multimedia ISDN PC," *IEEE Computer Graphics & Applications*, pp. 24–33 (Sep. 1993).

Eleftherladis et al., "Architecture and Algorithms of the Xphone Multimedia Communication System," *Multimedia Systems*, 4:89–100 (1994).

Delgrossi et al., "Media Scaling in a Multimedia Communication System," *Multimedia Systems*, 2:172–180 (1994).

Hui et al., "GRAMS: A Distributed Multimedia Service System," High–Speed Networking and Multimedia Computing, *SPIE Proc.*, vol. 2188, pp. 189–199 (Feb. 1994).

Jäger, "Introducing video communication and presentation to desktop computers," High–Speed Networking and Multimedia Computing, *SPIE Proc.*, vol. 2188, pp. 350–361 (Feb. 1994).

Crutcher, "The Networked Video Jukebox," *IEEE Transactions On Circuits And Systems For Video Technology*, vol. 4, No. 2, pp. 105–120 (Apr. 1994).

Campbell et al., "A Quality of Service Architecture," *Computer Communication Review*, vol. 24, No. 2, pp. 6–27 (Apr. 1994).

Krishnamurthy et al., "Connection–Oriented Service Renegotiation for Scalable Video Delivery," International Conference on Multimedia Computing and Systems, pp. 502–503 (May 1994).

HTTP Protocol versions 0.9, 1.0, and 1.1, particularly the HTTP Negotiation Algorithm.

Re. Format Negociation [sic, Negotiation] In Practice, public Internet use group dicussion available at http://ksi.cpsc.ucalgary.ca/archives/WWW–TALK/www–talk–1994q4/ (1994).

Re: Image quality on the Web, public Internet use group discussion available at http://ksi.cpsc.ucalgary.ca/archives/WWW–TALK/www–talk–1994q4/ (1994).

An MGET Proposal for HTTP, public Internet use group discussion available at http://ksi.cpsc.ucalgary.ca/archives/WWW–TALK/www–talk–1994q4/ (1994).

Long et al., "An Application–Level Technique for Faster Transmission of Large Images on the Internet," *Proc: SPIE*: Multimedia Computing and Networking 1995, vol. 2417, pp. 116–129 (Feb. 1995).

Baugher, "The OS/2 Resource Reservation System," Multimedia Computing and Networking 1995, *Proc. SPIE*, vol. 2417, pp. 167–176 (Feb. 1995).

Hui et al., "Client–Server Synchronization and Buffering for Variable Rate Multimedia Retrievals," *IEEE Journal On Selected Areas In Communications*, 14:226–237 (Jan. 1996).

Hofmann et al., "Making Progressive Transmission Adaptive," *IEEE Transactions On Communications*, 34:806–813 (Aug. 1986).

Holtz et al., "Lossless Image Compression with Autosophy Networks," Proc. SPIE: Image and Video Processing, vol. 1903, pp. 266–279 (Feb. 1993).

Bulterman et al., "A Distributed Approach to Retrieving JPEG Pictures in Portable Hypermedia Documents," Proc. IEEE: Multimedia Technologies and Future Applications, pp. 107–117 (Apr. 1993).

Hwang et al., "Multiresolution Multiresource Progressive Image Transmission," *IEEE Transactions On Image Processing*, vol. 4:, No. 8, pp. 1128–39 (Aug. 1995).

HP's JetSend Communications Protocol Specification, Hewlett–Packard Company (1998).

HP OpenPix—Getting Started, Hewlett–Packard Company (Jun. 1998).

HP Internet Imaging Operation—OpenPix Server Image Source Module (ISM) Developer's Guide v. 1.0 (Nov. 1997).

HP's Internet Imaging Protocol (Version 1.0.5), Hewlett–Packard Company (1997).

HP's Internet Imaging Protocol (Version 1.0.6), Hewlett–Packard Company (1997).

Castanet et al., "Networks for Image Transmission," *Research into Networks and Distributed Applications*, pp. 649–663 (Apr. 1988).

Wiseman et al, "A Prototype Color Image Server," *Advanced Session of IIEEJ on Document Processing and Digital Imaging*, pp. 239–242 (1992).

International Telecommunication Union Recommendation T.30, "Procedures for Document Facsimile Transmission in the General Switched Telephone Network," published Mar. 1993.

* cited by examiner

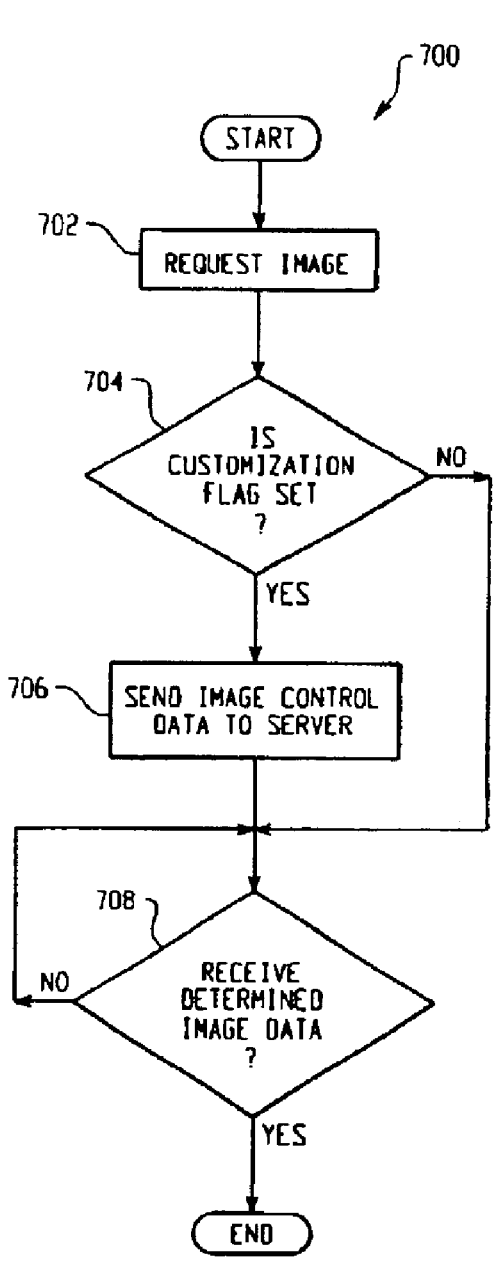
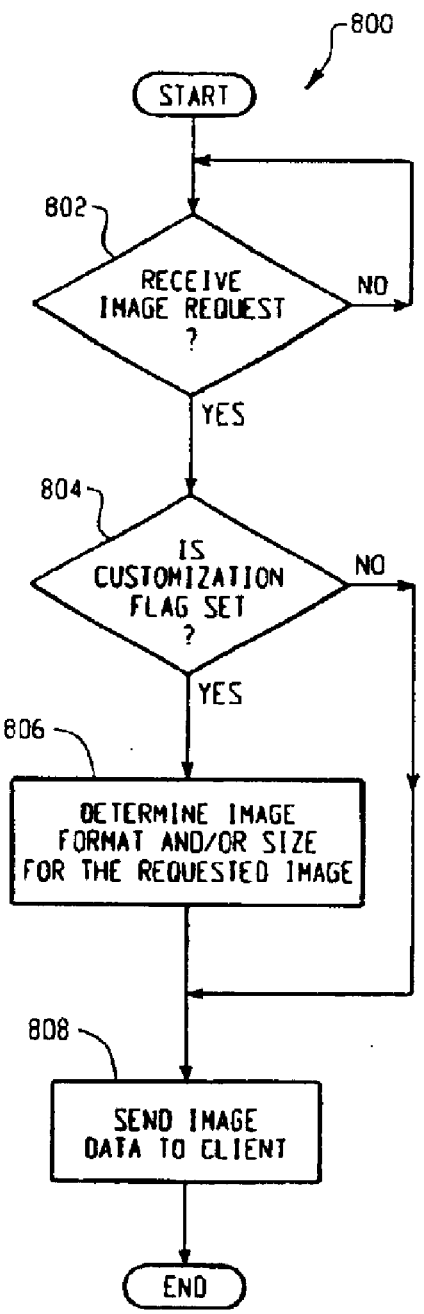
Fig. 7
Fig. 8

COMPUTER IMPLEMENTED METHOD AND SYSTEM FOR TRANSMITTING GRAPHICAL IMAGES FROM SERVER TO CLIENT AT USER SELECTABLE RESOLUTION

CROSS REFERENCE TO RELATED APPLICATIONS

This application is a continuation of U.S. application Ser. No. 09/036,268, filed Mar. 6, 1998 now U.S. Pat. No. 6,501,472 which is a continuation of U.S. application Ser. No. 08/622,528 filed Mar. 25, 1996, now U.S. Pat. No. 5,764,235.

BACKGROUND OF INVENTION

1. Field of the Invention

The present invention relates to graphical images and, more particularly, to the transmission of graphical images.

2. Description of the Related Art

To meet the multimedia revolution, computers have become more powerful and have provided more multimedia support. In particular, graphic capabilities of personal computers have been greatly enhanced in recent years due to technological improvements in peripheral devices and software products. Input peripheral devices, such as scanners and CD-ROM players, enable personal computers to obtain graphical image files. Software products can also be used to create graphical images using paint or drawing programs. Output peripheral devices, such as printers and plotters, can be used to print the graphical images.

The Internet (also referred to as the World Wide Web) is also part of the multimedia revolution because it acts as a large depository of image files which can be down-loaded for viewing, storing and/or printing. For example, web pages available at web sites on the Internet commonly include graphical images that are to be down-loaded to visitors to the web site.

One major problem, however, with down-loading graphical image files from the Internet is bandwidth constraints. Due to the large file size of graphical image files, a high bandwidth is needed for transmission of graphical image files in acceptable amounts of time. The bandwidth constraints are primarily due to how user's computers connect to the Internet. Computers are typically connected to the Internet using modems and standard telephone lines. Some users are fortunate enough to couple to the Internet with high speed connections (e.g., T1, T3 or ISDN lines). In any case, most users are connected to the Internet through 14.4 kbits/second or 28.8 kbits/second modems which are relatively slow and therefore a bandwidth constraint for down-loading sizable graphical image files. Hence, the average time it takes to down-load a graphical image file to a user's computer is unduly long. Thus, the communication links by which user's computers connect to the Internet are the transmission bottleneck.

Compression techniques can be used to provide some relief to the transmission bottleneck. By compressing the graphical image files using known compression techniques (such as JPEG), the graphical image file can be reduced in size. However, the reduction in size provided by compression does lead to distortion. The amount (or rate) of compression an image can withstand before showing noticeable distortion depends of the Image and the viewing medium, but a nominal amount would be 15- to 1 compression. Although a limited amount of compression is acceptable, there is a limit as to the compression rate that still produces acceptable quality. The amount of compression achieved by existing compression techniques does not provide both high quality and rapid transmission over modem connections. The author of an image who prepares a graphical image file for the image that is to be accessed through a network must choose a level of compression to achieve a tradeoff between image quality and transmission time. Consequently, compression helps with the bandwidth constraints or transmission bottleneck, but does not sufficiently solve the problem.

The transmission of graphical image files in networks within companies (internet) face similar problems. While some users may have high speed connections to servers on the internet, other users have much slower modem connections. However, both types of users need to obtain graphical image files with acceptable response times. Hence, in the internet case, the communication links by which user's computers connect to the internet are also the transmission bottleneck.

Thus, there is a need for improved techniques for transmission of graphical image files in a network environment so that the available bandwidth is used more efficiently.

SUMMARY OF INVENTION

Broadly speaking, the invention relates to techniques for transmitting graphical images in a network environment wherein the amount of data of the graphical images that is transmitted for each of the graphical images is customized in accordance with client and/or server supplied information. The techniques thus enable graphical images to be transmitted more flexibility and efficiently. As a result, the amount of data transmitted is customized for the particular situation. Hence, excess data need not be transmitted when the requester does not need or desire it. Alternatively, a request for a very high quality image can be satisfied. Accordingly, the invention makes significantly better and more intelligent use of the available bandwidth of the network environment. The invention can be implemented in numerous ways, including as a method, process, system, and a computer readable media.

As a computer-implemented method for transmitting a graphical image from a server machine to a client machine, an embodiment of the invention performs the operations of: receiving, at the server machine, a request for a graphical image from a client machine, the graphical image being stored on the server machine and having a predetermined total image size; obtaining image control information; determining an appropriate amount of data for the graphical image to be transmitted based on at least the image control information, the appropriate amount being less than or equal to the predetermined total image size; and transmitting the graphical image to the extent of the appropriate amount from the server machine to the client machine.

As a computer-implemented method for transmitting a graphical image from a server machine to a client machine, another embodiment of the invention performs the operations of receiving, at the server machine, a request for a graphical image from a client machine; negotiating between the server machine and the client machine to determine a quality-size tradeoff for the graphical image; and transmitting the graphical image to the extent of the quality-size tradeoff from the server machine to the client machine.

As a computer-implemented identification process for a server machine connected to a client machine over a network, an embodiment of the invention performs the operations of, receiving, at a server machine, a capabilities query from a client machine; sending a response to the capabilities query from the server machine to the client machine; determining whether the client machine supports image customization based on the capabilities query; and identifying the client machine as a client machine that supports image customization when the determining operation determines that the client machine supports image customization. Preferably, the image customization operates to set a reduced total image size for a graphical image.

As a computer-implemented method for receiving at a client machine a graphical image from a server machine, an embodiment of the invention includes the operations of sending a request for a graphical image to a server machine; sending image control information from the client machine to the server machine; and receiving from the server machine the graphical image of a determined amount, the determined amount being based on at least the image control information. Preferably, the determined amount is a reduced amount, and the graphical image file received also has a determined format based on at least the image control information. As examples, the determined format may be suitable for storing, displaying or printing an image associated with the graphical image file received.

As a system for transmitting graphical image files, an embodiment of the invention includes a client machine operating to store client image control information, request a graphical image file, and forward the client image control information; a server machine operating to store graphical image files, receive the request and the client image control information from the client machine, determine an appropriate amount of data for the graphical image file requested, and forward the graphical image file requested with the appropriate amount of data: and a network for coupling together the client machine and the server machine, wherein the request being forwarded, the client image control information, and the graphical image file being forwarded each traverse the network. Preferably, the graphical images stored in the server machine are stored using a progressive compression format. The network can be any network suitable for interconnecting computers.

As a computer readable media containing program instructions for transmitting a graphical image from a server machine to a client machine, an embodiment of the invention includes: first computer readable code devices for receiving, at the server machine, a request for a graphical image from a client machine; second computer readable code devices for negotiating between the server machine and the client machine to determine a quality-size tradeoff for the graphical image requested; and third computer readable code devices for transfer. Letting the graphical image file to the extent of the quality-size tradeoff from the server machine to the client machine.

The advantages of the invention are numerous. One advantage of the invention is that graphical images can be transmitted over a network with a reduced amount so as to conserve precious network bandwidth, improve transmission time, and to reduce loads placed on server machines. Another advantage is that a user has a choice as to the amount of a graphical image file needed depending on an intended use for the image. For the images are simply being displayed in a small one inch by one inch arrangement, then only a small amount of the graphical image file need be transmitted. On the other hand, if the image is to be printed with high quality at a page-size, then a substantially larger amount of the graphical image file needs be transmitted (but this is typically still less than the complete graphical image file). In either case, less data is transmitted so less bandwidth is required and transmission time is improved. Further, in the case where the image is to be printed with picture quality on a large format, then a large amount (perhaps all) of data would be transmitted, which is very likely more data than would be conventionally available. The format of the data can also vary with the intended use (e.g., display format, printer formats, storage formats, etc.). Another advantage of the invention is that an author of an image need only store the associated graphical image file once in a high quality format, thereafter, the invention operates via a negotiation process between client and server, to meter down the amount of the graphical image file as is warranted. Yet another advantage of the invention is that moves with technology in that as transmission bandwidth becomes greater or transmission rates become faster, the previously stored image files are automatically useable without changes.

Other aspects and advantages of the invention will become apparent from the following detailed description, taken in conjunction with the accompanying drawings, illustrating by way of example the principles of the invention.

BRIEF DESCRIPTION OF DRAWINGS

The present invention will be readily understood by the following detailed description in conjunction with the accompanying drawings, wherein like reference numerals designate like structural elements, and in which:

FIG. 7 is a flow diagram of client processing according to an embodiment of the invention;

FIG. 8 is a flow diagram of server processing according to an embodiment of the invention;

DETAILED DESCRIPTION

Embodiments of the invention are discussed below with reference to the drawings. However, those skilled in the art will readily appreciate that the detailed description given herein with respect to these figures is for explanatory purposes as the invention extends beyond these limited embodiments.

Figure 1A:
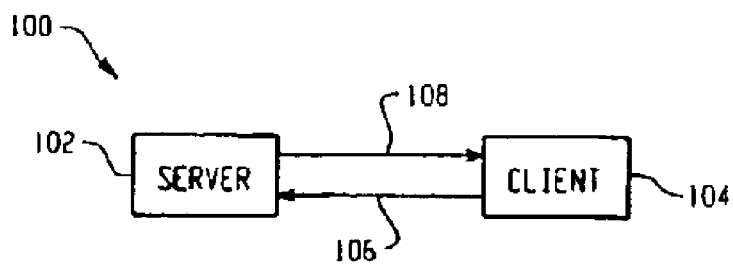
FIG. 1A is a basic block diagram of a communications system according to an embodiment of the invention.

FIG. 1A is a basic block diagram of a communications system 100 according to an embodiment of the invention. The communications system 100 includes a server 102 and a client 104. Images are stored on the server 102 and each image typically has a predetermined physical size and resolution that lead to a total image size. Each such image is stored on the server 102 as an image file. The client 104 sends a request for an image over a link 106 to the server 102. The server 102 then in turn sends an appropriate amount of data for the corresponding image file to the client 104 over a link 108.

Figure 1B:
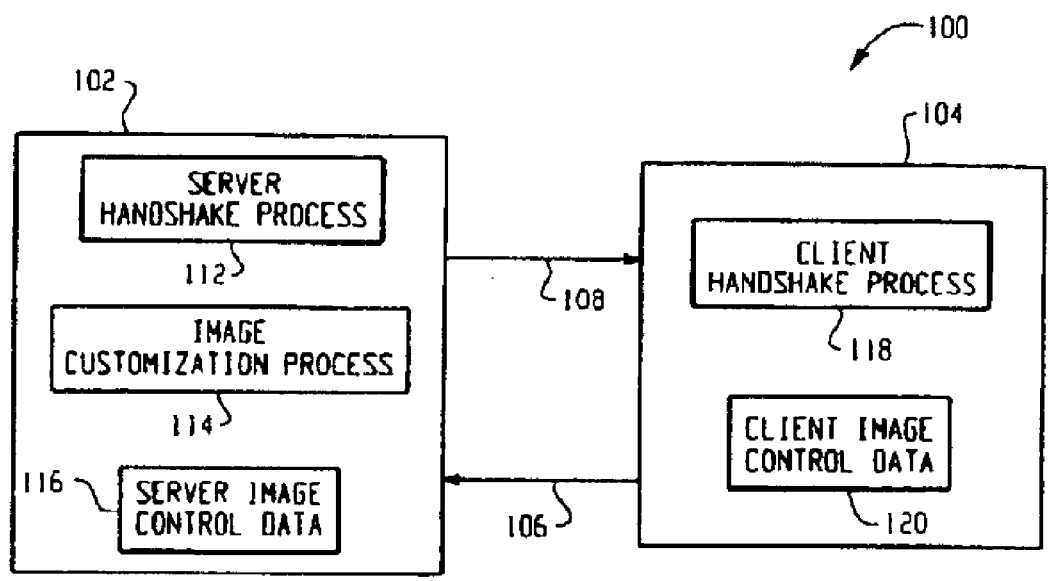
FIG. 1B is a detailed block diagram of the communications system illustrated in FIG. 1.

FIG. 1B is a detailed block diagram of the communications system 100 illustrated in FIG. 1. The server 102, besides conventional processes and data, includes a server handshake process 112, an image customization process 114, and server image control data 116. The client 104, besides conventional processes and data, includes a client handshake process 118 and client image control data 120. The server handshake process 112 cooperates with the client handshake process 118 to allow the client 104 and the server 102 to determine whether they both support image customization. If both the client 104 and the server 102 do support image customization, then the server 102 is able to use the image customization process 114 on image files to be transmitted to the client 104. The image customization process 114 operates to customize both the amount of data and the format of graphical image files to be sent to the client 104. In performing the image customization process 114, the server 102 makes use of the server image control data 116 and/or the client image control data 120 so that the customization is intelligently performed. The client image control data 120 is data or information obtained from the client 104 that is useful in determining both the suitable amount of data and/or format for the graphical image files to sent. The server image control data 116 is data or information obtained from the server 102 that is useful in determining both the amount of data and/or format for the graphic image files to be sent.

Figure 2:
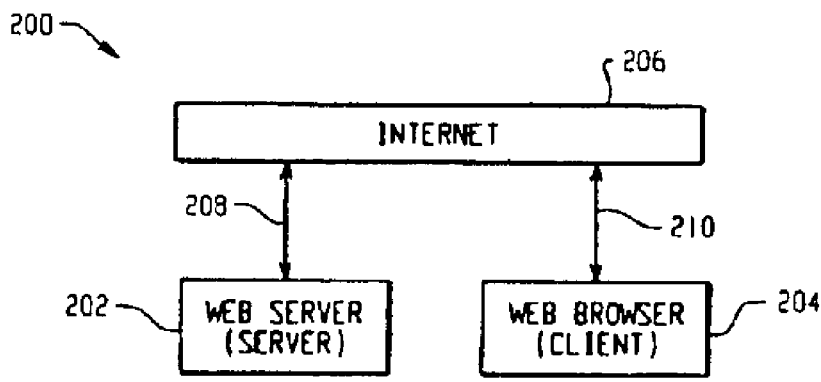
FIG. 2 is a basic block diagram of an Internet arrangement.

FIG. 2 is a basic block diagram of an Internet arrangement 200. The Internet arrangement 200 includes a web server 202, a web browser 204 and the Internet 206. The web server 202 is more generally referred to as a server or a server machine and the web browser 204 is more generally referred to as a client or a client machine. The Internet 106 is an international network of interconnected computers as is well known in the art. The web server 202 couples to the Internet 206 via a link 208. The web browser 204 couples to the Internet 206 via the link 210. The web browser 204 sends a web page request over a link 210 to the web server 202. The web server 202 then in turn sends the corresponding web page HTML file to the web browser 204 over a link 210. Then, the web browser 204 searches through the web page HTML page to determine whether or not graphical image files are contained within the web page. If image files are contained within the web page, the web browser 204 requests the image files from the web server 202 over the link 208. The web server 202, upon receiving the request for the image file, forwards the appropriate image file to the web browser 204 through the Internet 206 and the links 208 and 210.

The Internet arrangement 200 is one of many possible implementations of the communications system 100. In should be recognized that the invention is applicable to any network environment whether it be the Internet or various intranets such as Local-Area Networks (LANs) or Wide-Area Networks (WAN). The network can be a wired network, a wireless network, or some combination of both.

The transmission of large amounts of image data from the server 102 (web server 202) to the client 104 (web browser 204) requires a large amount of bandwidth in the communications path. In FIGS. 1A and 1B the communications path is simply the link 108 and in FIG. 2 the communications path is the Internet 206 and the links 208, 210, but these illustrative communication paths are two representative communication paths through a network of computers. The need for large amounts of bandwidth is conventionally needed to transfer image files (i.e., graphics data) over a network from a server machine to a client machine. As an example, a simple drawing or graphic can be 20 NM of data and a medium complexity drawing from a drawing program can be upwards of 100 NM of data. Thus, transmission of image files is data intensive. As a result, if a large bandwidth is not available, then transmission speed must be very fast, else the server cannot transmit (e.g., download) the image data with satisfactory. speed. Other problems which result are that the server is unable to service as many clients and even those that it does service must endure considerable delays.

The invention provides a solution to these and other problems by customizing the amount of image data to be transmitted in accordance with client and/or server supplied information. The invention thus enables graphical image files to be transmitted more flexibility and efficiently. As a result, the amount of data transmitted is customized for the particular situation. Hence, excess data need not be transmitted when the requester does not need or desire it. Alternatively, a request for a very high quality image can be satisfied. Accordingly, the invention makes significantly better and more intelligent use of the available bandwidth of a network.

Figure 3:
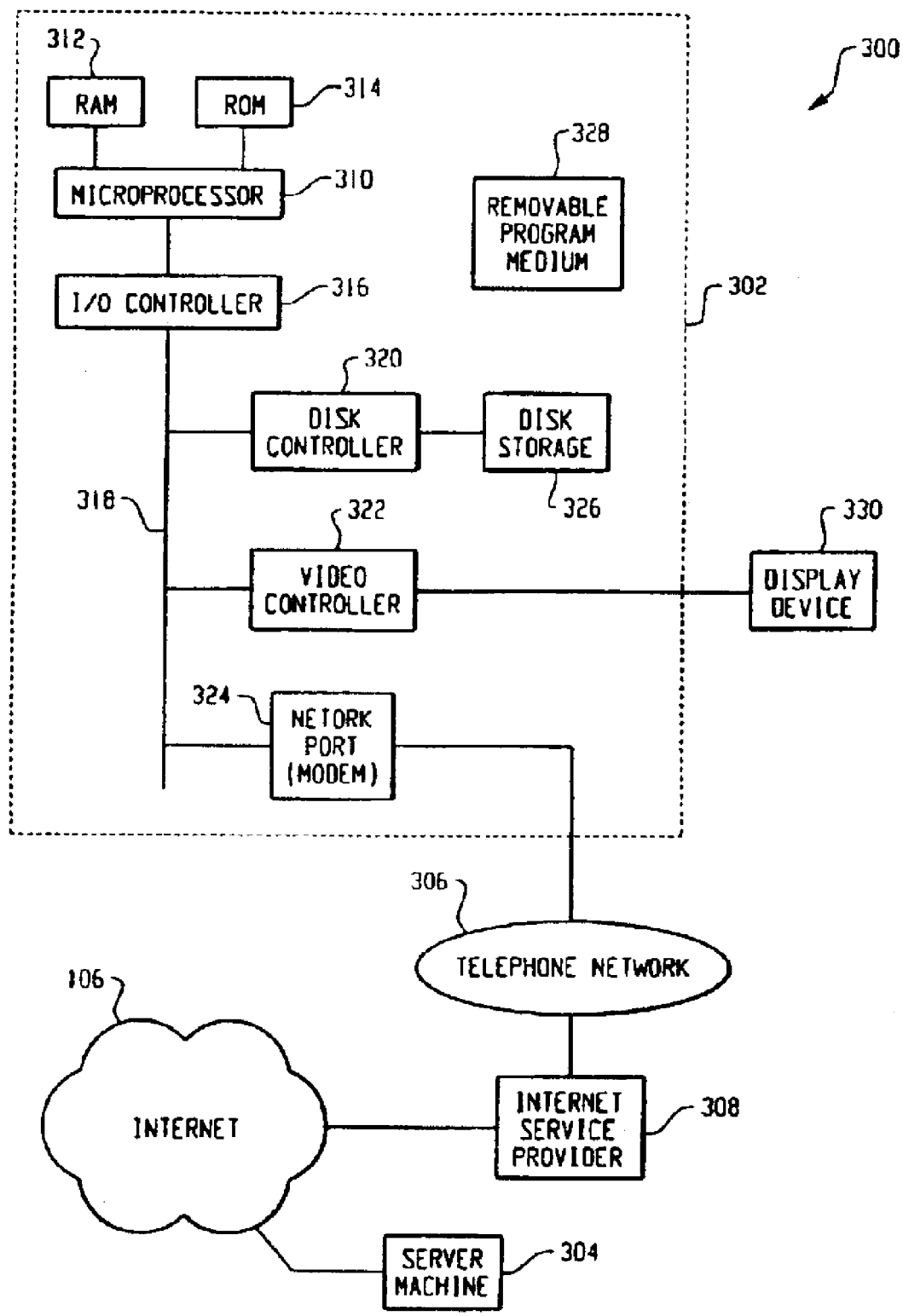
FIG. 3 is a detailed block diagram of an Internet arrangement.

FIG. 3 is a detailed block diagram of an Internet arrangement 300. The Internet arrangement 300 includes a client machine 302 and a server machine 304. The server machine 304 is typically directly connected to the Internet 106 over a high speed link. The client machine 302 is typically a computer system which connects to the Internet 106 through a telephone network 306 and an Internet service provider 308. (00411 The improved techniques for transmitting graphical images according to the invention can be implemented by numerous computer systems. The client machine 302 illustrated in FIG. 3 represents an exemplary computer system.

The client machine 302 includes a microprocessor 310 which is coupled to a random access memory (RAM) 312, a read only memory (ROM) 314 and an I/O controller 316. The I/O controller 316 is coupled to a bus 318. Also coupled to the bus 318 is a disk controller 320, a video controller 322 and a network port 324. A disk storage device 326 is coupled to the disk controller 320. A display device 330 is coupled to the video controller 322. The network port 324 in the exemplary embodiment includes a modem which couples to the telephone network 306 via telephone subscriber lines. The client machine 302 is usually also coupled to a printer (not shown) through a printer port.

The client machine 302 together with an operating system (not shown) operate to execute computer code. The computer code may reside on the RAM 312, the ROM 314, or the disk storage device 326. The computer code could also reside on a removable program medium 328 and then loaded or installed onto the client machine 302 when needed. Removable program mediums include, for example, CD-ROM, PC-CARD, floppy disk and magnetic tape.

The client machine 302 and the sever machine 304 illustrate in FIG. 3 also include the feature of the invention illustrated in FIG. 3. For example, preferably computer code for the client for the client handshake process 118 is stored in the RAM 312, the ROM 314, the disk storage device 326 or the removable program medium 328 and performed by the microprocessor 310. The client image control data 120 is preferably managed by the microprocessor 310 and stored in the RAM 312, the disk storage device 326 or the removable program medium 328. Similarly, the server handshake press 112, the image customization process 114 and the server image control data 116 associated with the sever machine 04 are effectuated by computer code within the server machine 304.

Figure 4A:
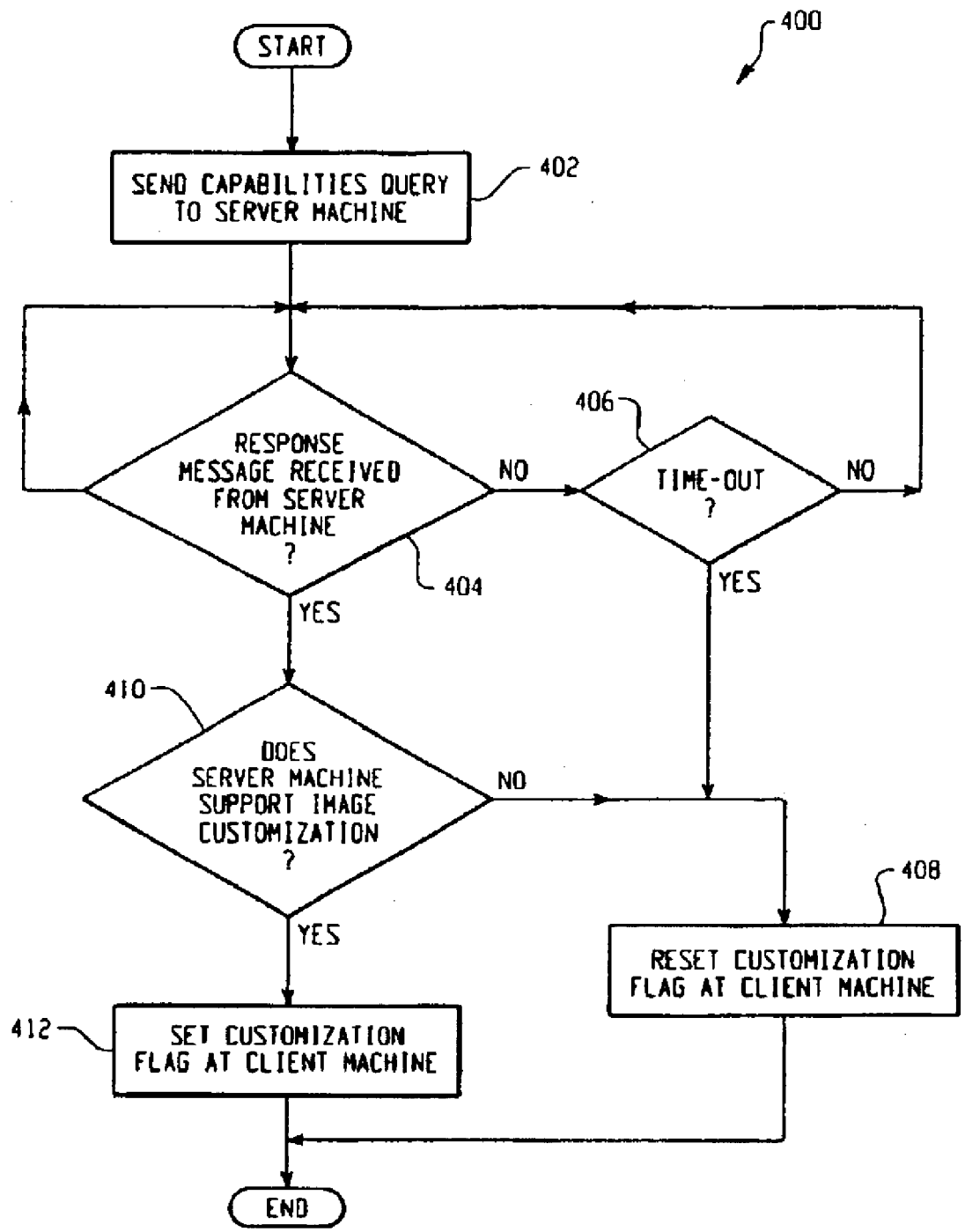
FIG. 4A is a flow diagram of handshake processing at a client machine according to an embodiment of the invention.

FIG. 4A is a flow diagram of client handshake processing 400 according to an embodiment of the invention. Preferably, the client handshake process 118 within the client machine (104, 204, 302) performs the client handshake processing 400.

The client handshake processing 400 initially sends 402 a capabilities query to the server machine (102, 202 304). That is, the client machine (e.g., the web browser operating thereon) sends the capabilities query to the server machine (e.g., the web server operating thereon) via a network (e.g., the Internet 106). The capabilities query is constructed so as to query the server machine to determine whether it supports image customization. For example, the capabilities query may ask the server machine what image formats, compression schemes, etc. it supports. Next, a decision 404 determines whether a response (e.g., a response message) has been received from the server machine. If no response has been received, the decision block 404 causes the client handshake processing 400 to await such a response. While the handshake processing 400 is awaiting a response, a decision 406 determines whether a time-out has occurred. A time-out is determined to have occurred when a response has not been received from the server machine for a predetermined period of time. If the time-out occurs, then it is determined by default that the server machine does not support image customization, thus a customization flag at the client machine is reset 408 and then the client handshake processing 400 is complete and ends. The resetting 408 of the customization flag is used to signal the client machine that image customization is unavailable.

On the other hand, if a response is received from the server machine, the client handshake processing 400 continues. In particular, following block 404 when a response is received, a decision 410 determines whether the server machine supports image customization. Here, the client handshake processing 400 examines the response from the server machine to determine whether the server machine supports customization if images.

If it is determined that the server machine does support image customization, then the customization flag at the client machine 302 is set 412. If, on the other hand, the server machine does not support customization of images, the customization flag at the client machine is reset 408 to indicate that customization is unavailable. The customization flag thus serves to notify the client machine as to whether image customization is available for subsequent transmission of graphical image files between the server machine and the client machine. Following block 412 or block 408, the client handshake processing 400 is complete and ends.

Figure 4B:
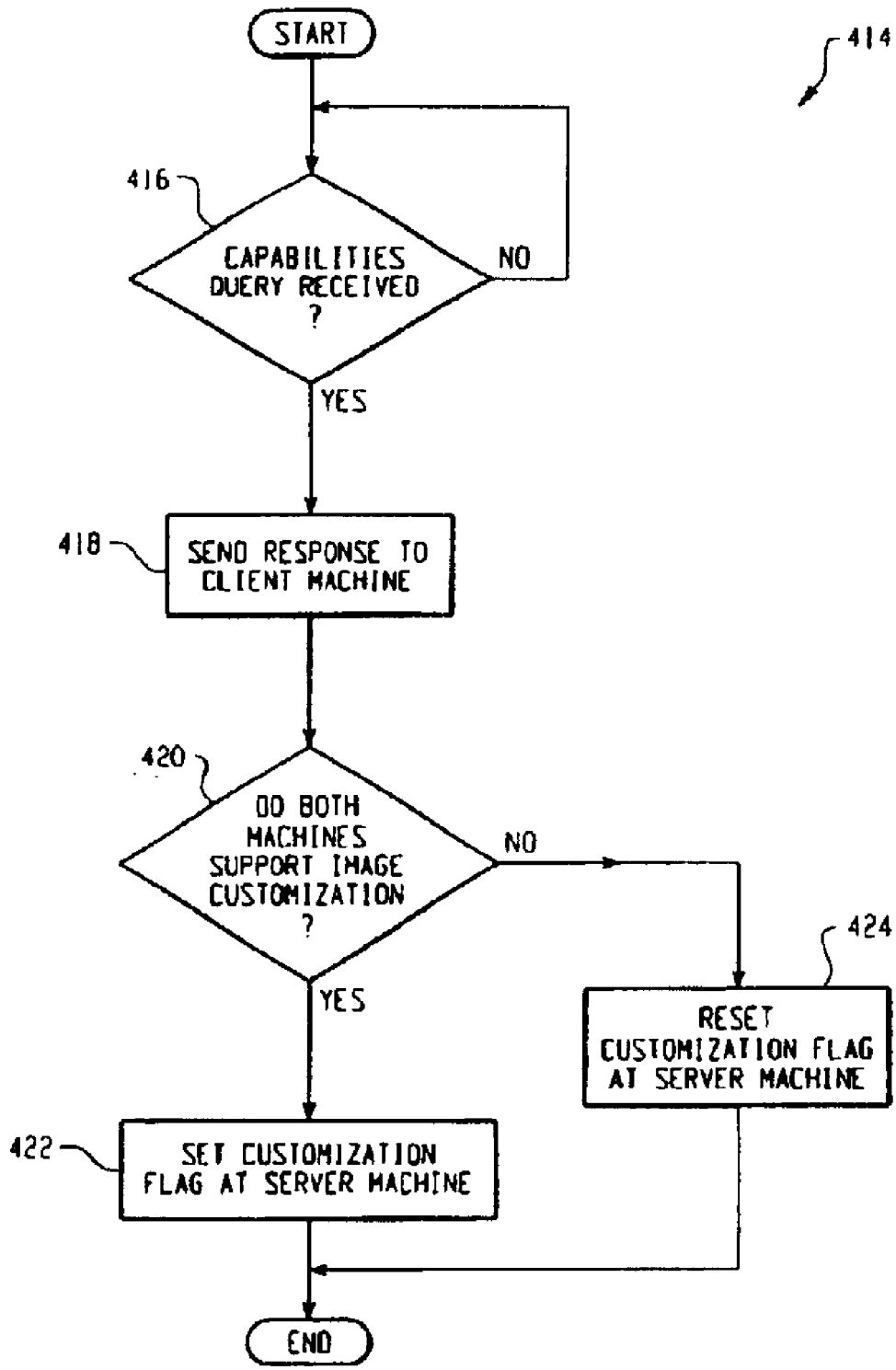
FIG. 4B is a flow diagram of handshake processing at a server machine according to an embodiment of the invention.

FIG. 4B is a flow diagram of server handshake processing 414 according to an embodiment of the invention. Preferably, the server handshake process 112 within the server machine (102, 202, 304) performs the server handshake processing 414.

The server handshake processing 414 begins with a decision 416 which determines whether a capabilities query has been received from a client machine. The decision 416 causes the server handshake processing 414 to await the reception of a capabilities query. Once a capabilities query is received, a response (e.g., a response message) is sent 418 to the client machine. Then, a decision 420 determines whether both the client and server machines support image customization. The server machine knows whether it supports image customization, and the server machine can determine whether the client machine supports image customization from the capabilities query which was received from the client machine. Next, when it is determined that both the client and server machines support image customization, a customization flag at the server machine is set 422. Otherwise, when it is determined that one or both the client and server machines do not support image customization, a customization flag at the server machine is reset 424. The customization flag servers to notify the server machine as to whether image customization is available for subsequent transmission of graphical image files between the server machine and the client machine. Following block 422 or block 424, the server handshake processing 414 is complete and ends.

Through the client handshake processing 400 and the server handshake processing 414, the client machine (104, 204, 302) and the server machine (102, 202, 304) are able to interact with each other to determine whether they both support image customization. Of each different client-server pair, the handshake processing 400, 414 is repeated. An alternative implementation could have the server machine initiate the handshake between client and server.

Figure 5:
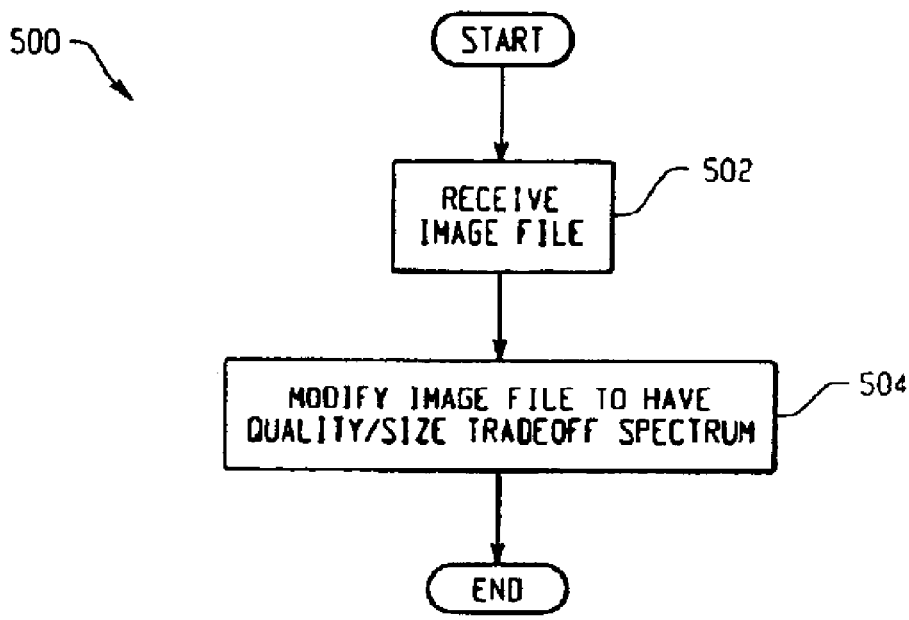
FIG. 5 is a flow diagram of image processing performed by a server machine processing according to an embodiment of the invention.

FIG. 5 is a flow diagram of image processing 500 performed by the server machine according to an embodiment of the invention. The image processing 500 is utilized by the server machine to customize the images. Namely, the data associated with a graphical image file is customized in a manner such that image quality versus size can be controlled. Specifically, the image processing 500 receives 502 a graphical image file. Typically, the graphical image file that is received 502 is stored on the server machine 304. In the Internet context, these graphical image files typically form graphical images within web pages. Following block 502, the graphical image file is modified 504 to have a variable or selectable quality versus size tradeoff. The modifications 504 to the graphical image file are preferably done in advance and then stored on the server machine 304 in a manner suitable for accessing the graphical image file using the variable or selectable quality versus size tradeoff.

Figure 6A:
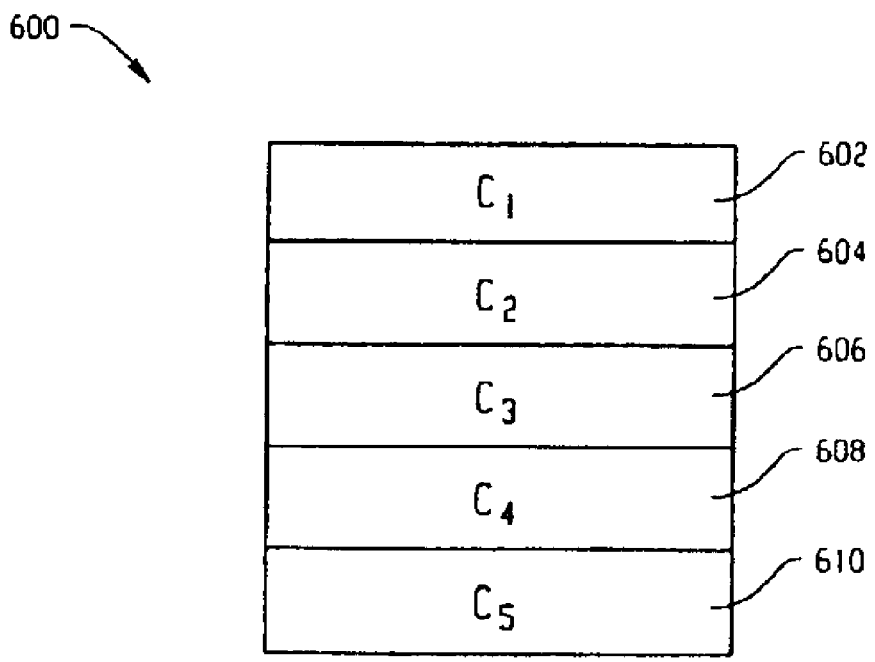
FIG. 6A is a representative diagram of a modified image file according to an embodiment of the invention.

FIG. 6A is a representative diagram of a modified image file 600 according to the invention. The modified image file 600 is segmented into a first segment C, 602, a second segment C2 604, a third segment C3 606, a fourth segment C4 608, and a fifth segment C. 610. The section 602–610 are preferably encoded using a compression technique such as fractal compression or progressive JPEG. Each of these segments 602–610 contain data associated with the image represented by the graphical image file. However, each of the segments is additive to provide greater image quality but at a cost of larger image file size. The encoding of the segments is such that the first segment C, 602 can itself be displayed without any of the other segments. Then, for the next gradation in image quality or file size, the graphical image file transmitted would include the first segment C, 602 and the second segment C2 604. The third segment C3 606, the fourth segment C4 608 and the fifth segment C, 610 are likewise additive for even greater image quality or file size. For example, in Table 1, the first segment C, 602 may be 20 KB, and the first segment C, 602 and the second segment C2 604 may total to 100 KB. Hence, the first segment C. 602 can be used for displaying the image as a high quality, thumbnail size image or a low quality, feature size image. The combination of the first segment C, 602 and the second segment C2 604 can be used for displaying the image as a high quality, feature size image or a low quality, full screen size image.

The representative diagram of the modified image file 600 illustrated in FIG. 6A is particularly suited for fractal compression or progressive JPEG. However, more generally, the image file can be modified 504 according to the invention using any available compression technique or other file size reduction technique. The invention is flexible enough to be able to use the most appropriate compression or other file size reduction technique for each image, quality and size. The invention can also use different techniques for different parts of an image.

Figure 6B:
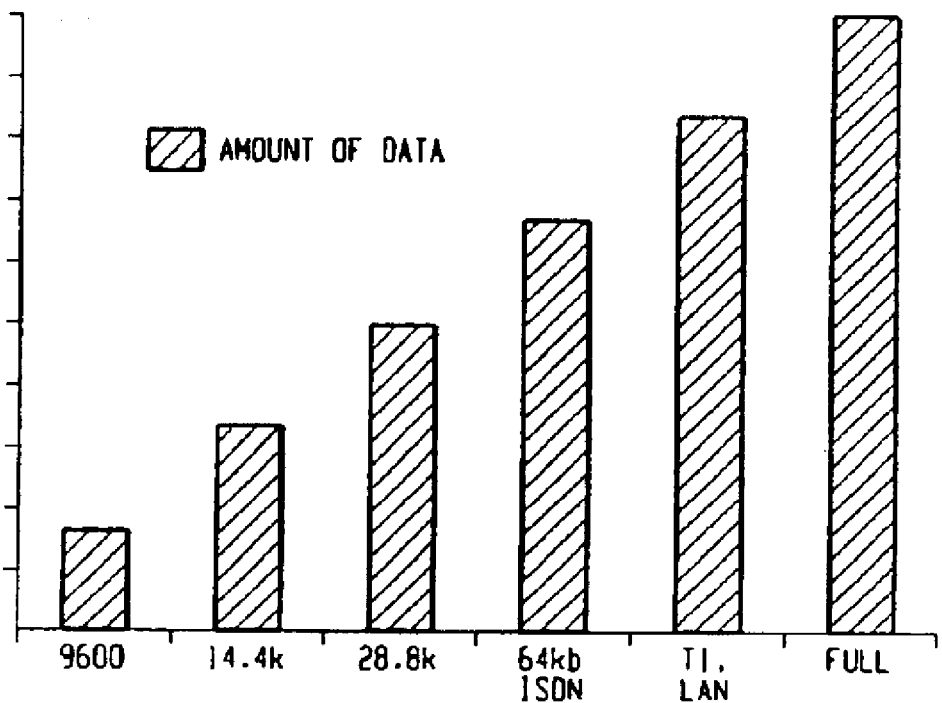
FIGS. 6B and 6C are bar charts illustrating amount of data as a percentage of the total amount of available data.
Figure 6C:
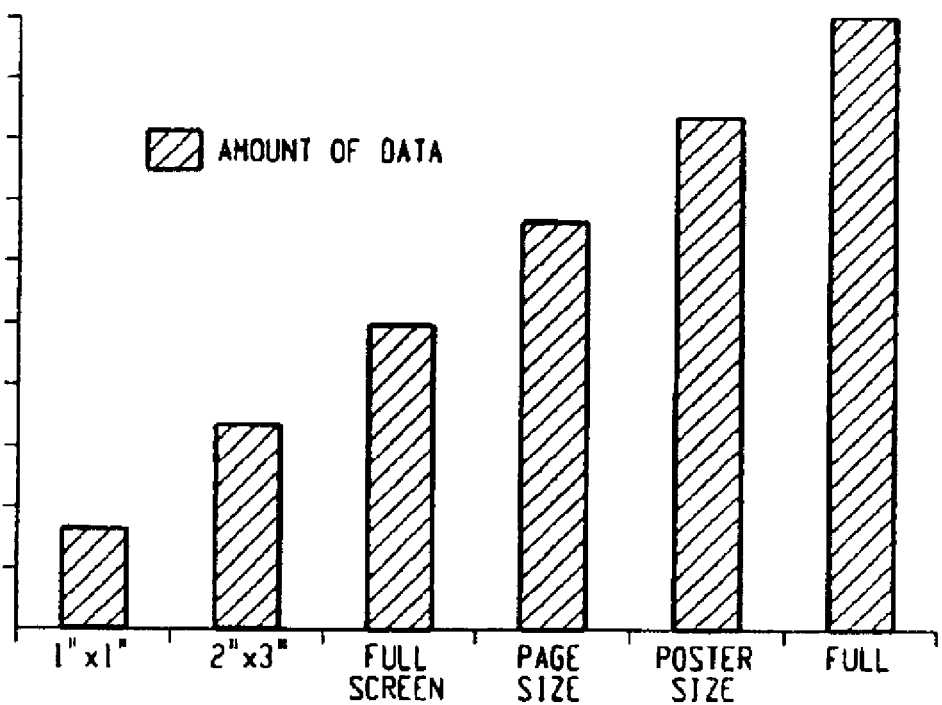

FIGS. 6B and 6C are bar charts illustrating amount of data as a percentage of the total amount of available data (e.g., image files size). FIG. 6B illustrates an example of the image customization with respect to different client transmission (modem) speeds. FIG. 6C illustrates an example of the image customization with res for the requested image. Notice in either of these customization, depends on the transmission modified Image file 600 can be used to provide the amounts incremental fashion.

FIGS. 7 and 8 are flow diagrams of the client-server interaction carried out to request and then transmit a graphical image file over a network interconnecting the client and server. The network may be of any type as previously mentioned.

FIG. 7 is a flow diagram of client processing 700 according to an embodiment of the invention. The client processing 700 is preferably performed by the client (client machine) 104.

The client processing 700 initially requests 702 a graphical image file from the server (server machine) 102. As an example, the request would identify the graphical image file desired together with a total image size and a requested quality level. Then, a decision 704 determines whether the customization flag is set at the client 104. If the decision block 704 determines that the customization flag is set, then image control data is sent 706 from the client to the server 102. On the other hand, if the decision block 704 determines that the customization flag is not set, then block 706 is bypassed. Following blocks 704 or 706, a decision 708 determines whether the requested image data has been received from the server 102. If not, the decision block 708 causes the client processing 700 to await reception of the requested image data (or a time-out occurs to end the processing 700). After the requested image data has been received, the client processing is complete and ends.

FIG. 8 is a flow diagram of server processing 800 according to an embodiment of the invention. The server processing 800 is preferably performed by the server (server machine) 102.

The server processing 800 begins with a decision 802 that determines whether a graphical image request has been received from a client. When the decision block 802 not intended uses the data, i.e., the segments of the that in an determines that a graphical image request has not been received, the server processing 800 repeats the decision block 802 until the graphical Image request is received. Once the graphical image request is received, the server processing 800 determines 804 whether the customization flag is set at the server. Recall that the server handshake processing 414 sets or resets the customization flag at the server (FIG. 4B). If the customization flag is set, an amount of data and/or image format for the requested image is determined 806. Here, the image that is to be transmitted from the server to the client is customized in accordance with the invention so that the amount of data and/or format are determined in accordance with image control data from the client as well as image control data from the server. Following block 806 or following the decision block 804 when the customization flag is not set, the image data is sent 808 to the client. Thus, when both client and server support customization of the amount and/or format of the image data, then customization is performed prior to transmission; otherwise, when customization is not supported the image data is sent as is without customization.

Figure 9:
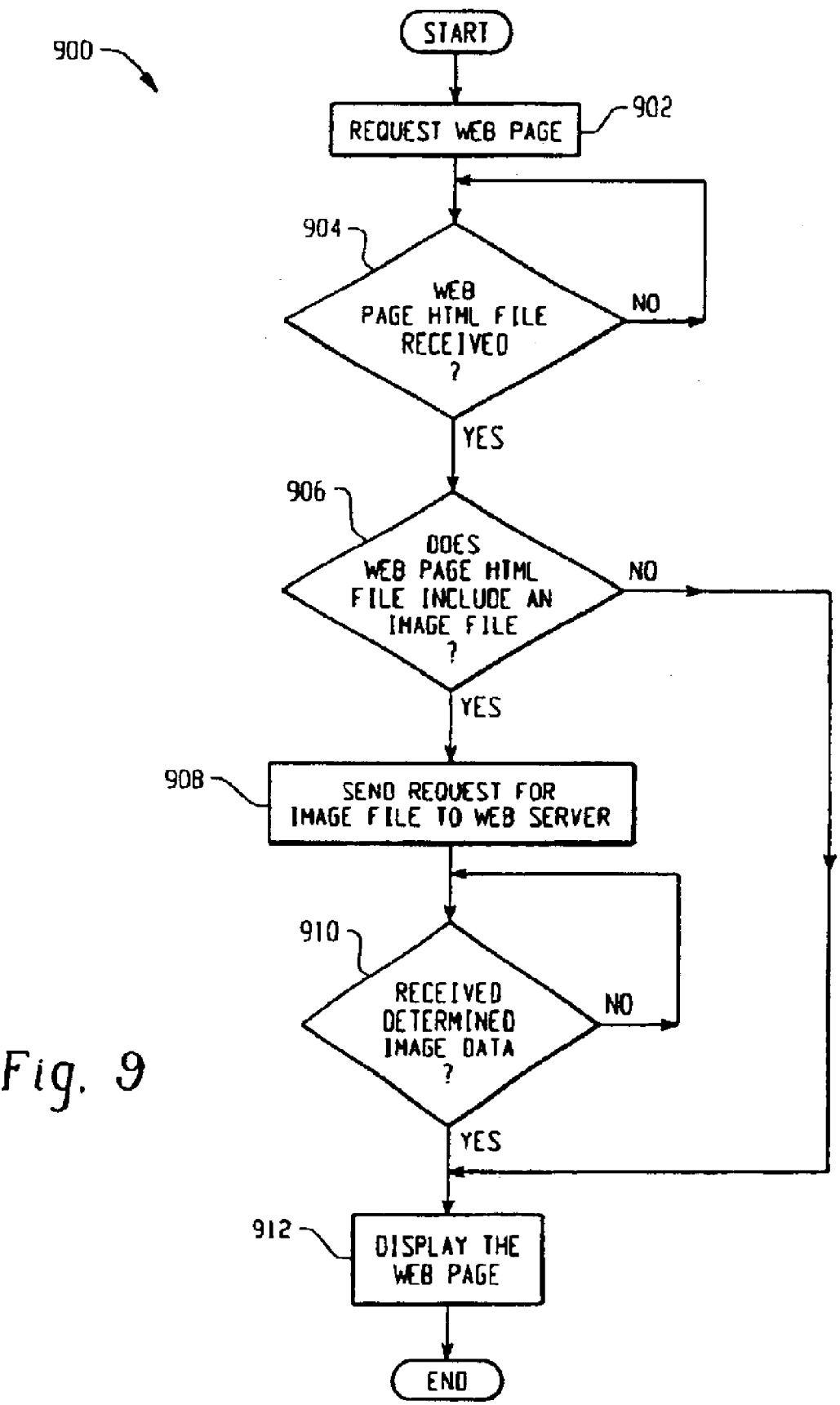
FIG. 9 is a flow diagram of web browser processing according to an embodiment of the invention.
Figure 10:
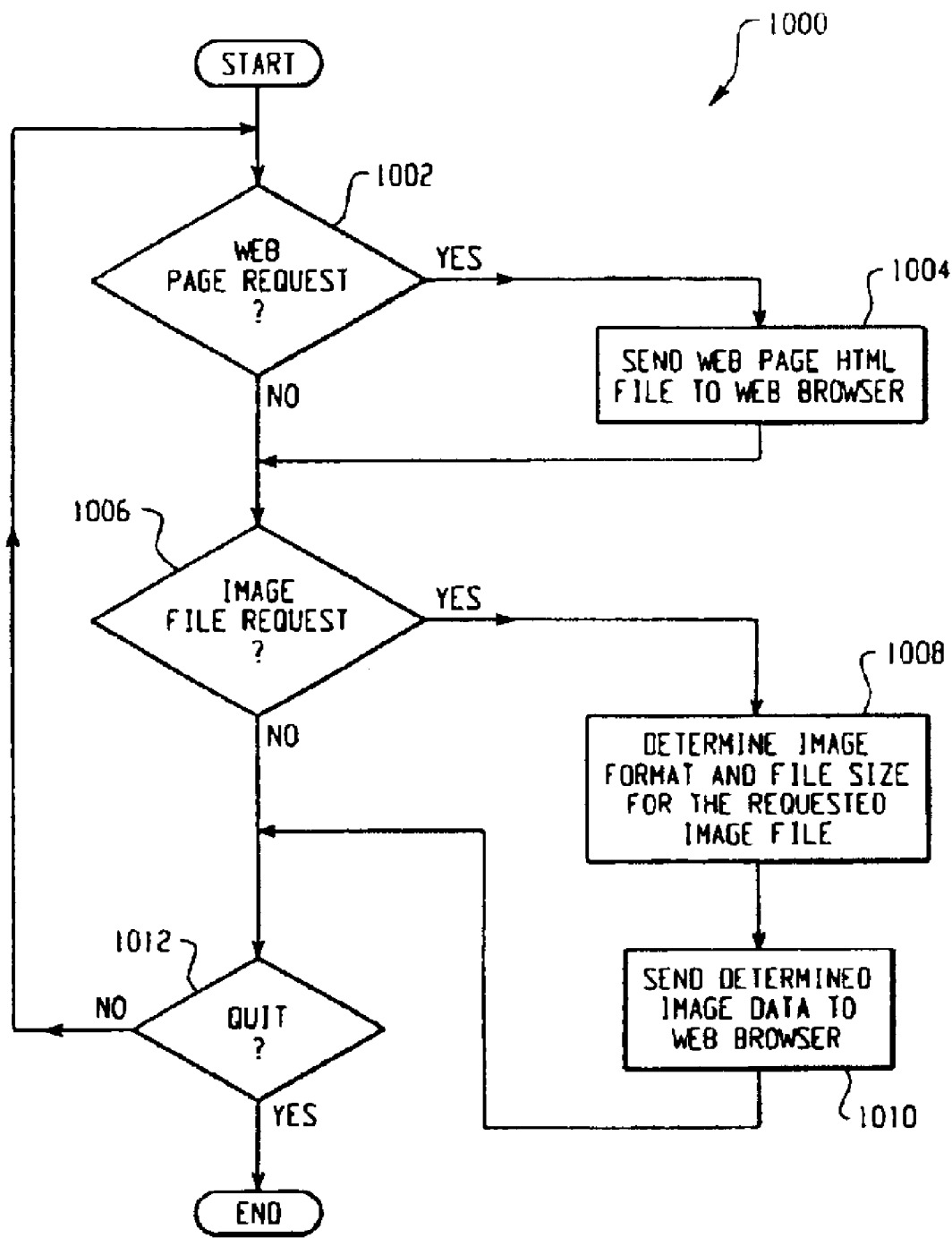
FIG. 10 is a flow diagram of web server processing according to an embodiment of the invention.
Figure 11:
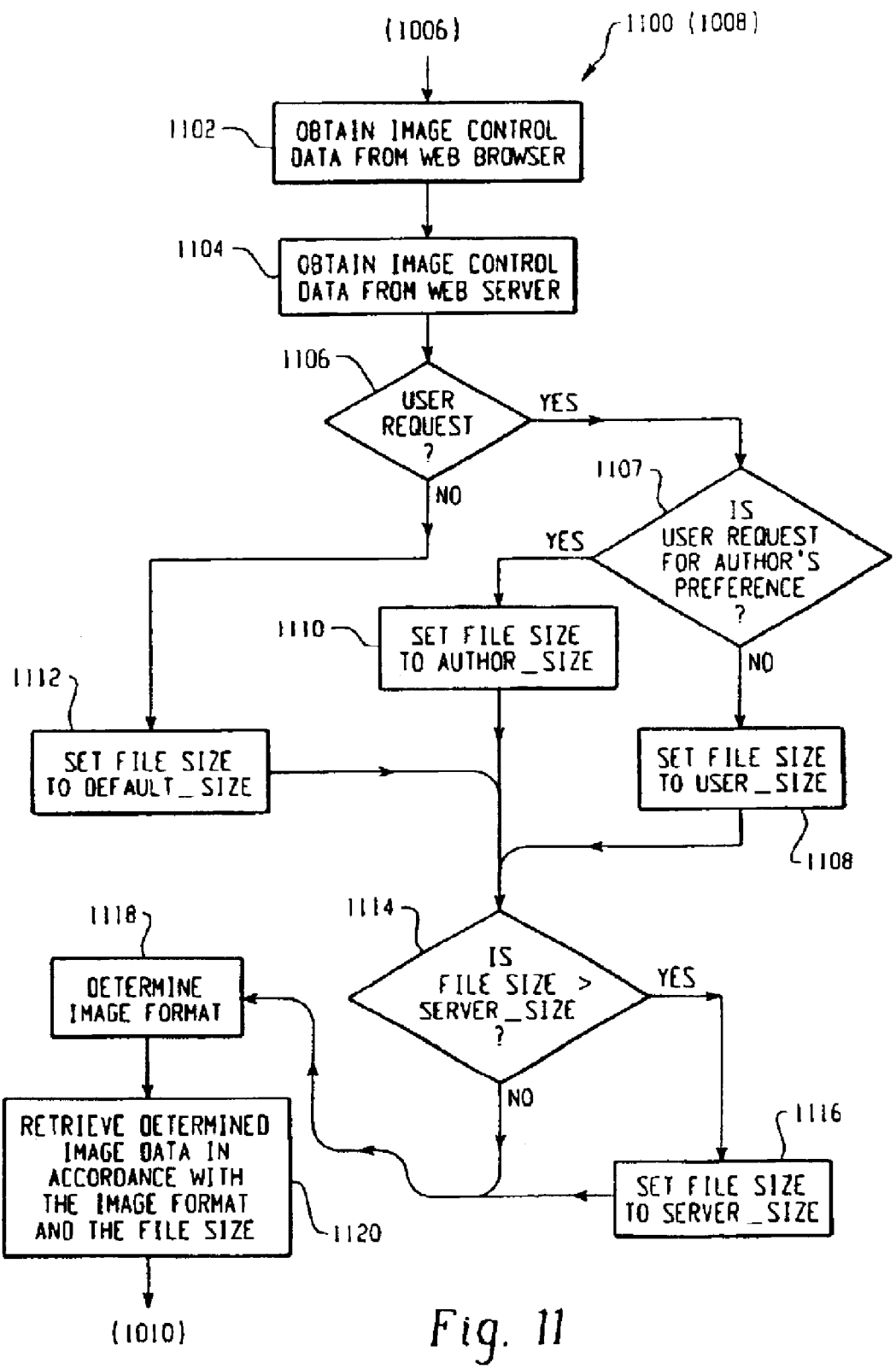
FIG. 11 is a flow diagram illustrating image customization processing according to an embodiment of the invention.

FIGS. 9–11 are flow diagrams of the client-server interaction carried out to request and then transmit a graphical image file over the Internet. In this situation, the network is the Internet, and the client and server are more particularly web browser and web server, respectively.

FIG. 9 is a flow diagram of web browser processing 900 according to an embodiment of the invention. The web browser processing 900 is preferably performed by a web browser (i.e., the web browser 204) because web browsers are commonly used to access and navigate through the Internet 206. More generally, however, the web browser is a client machine such as the client machine 104, 302.

The web browser processing 900 initially requests 902 a web page. The request for a web page is sent by the web browser 204 through the Internet 206 to the web server 202. The web browser processing 900 then determines 904 whether the web page HTML file has been received in response to the request for the web page. Until the web page HTML file is received (or a time-out occurs to end the processing 900), the web browser processing 900 awaits its reception. Once the web page HTML file has been received, a decision 906 determines whether the web page HTML file includes a graphical image file. If the web page HTML file does include a graphical image file, a request for the graphical image file is sent 908 to the web server 102. Then, a decision 910 awaits reception of the determined image data from the web server 102 (or a time-out occurs to end the processing 900). Following block 910 when the determined imaged data has been received or following block 906 when the web page HTML file does not include a graphical image file, the web page is displayed 912. In the case in which blocks 908 and 910 are performed, the web page displayed 912 includes a graphical image file. In the case in which the decision block 906 determines that the web page HTML file does not include a graphical image file, blocks 908 and 910 are skipped and the web browser processing 900 causes the web page to be displayed 912 without any graphical image file.

FIG. 10 is a flow diagram of web server processing 1000 according to an embodiment of the invention. The web server processing 1000 is preferably performed by a web server (i.e., the web server 202) because web servers are commonly used access sites (e.g., web sites) on the Internet 206. More generally, however, the web server is a server machine such as the server machine 102, 304.

The web server processing 1000 begins with a decision 1002 that determines whether a web page request has been received. If a web page request has been received from a web browser (e.g., web browser 204), the web page HTML file requested is sent 1004 to the web browser that has requested the web page. Next, following block 1004 or following the decision block 1002 when a web page is not being requested, a decision block 1006 determines whether a graphical image file request has been received. When a graphical image file request has been received from a web browser, the web server processing 1000 determines 1008 an image format and file size for the requested graphical image file. In effect, the determining 1008 customizes the graphical image file based on criteria such as user's conditions, server's conditions, user's request or author's preference, The customization of the graphical image file is described in greater detail below with reference to FIG. 11. Thereafter, the determined image data is sent 1010 to the web browser that requested the graphical image file.

Following block 1010 in the case in which a graphical image file request was received and processed, or following the decision block 1006 in the case when there has been no graphical image file request, a decision 1012 determines whether the web server processing 1000 has been shut down or quit. If the decision block 1012 determines that the web server processing 1000 is to be shut down or quit, the web server processing 1000 is complete and ends. On the other hand, when the web server processing 1000 has not been shut down or quit, the web server processing 1000 returns to repeat decision block 1002 and subsequent blocks, thereby forming a loop within the web server processing 1000.

FIG. 11 is a flow diagram illustrating image customization processing 1100 according to an embodiment of the invention. The image customization processing 1100 is a detailed diagram of the block 1008 in FIG. 10.

The image customization processing 1100 initially obtains 1102 image control data from the web browser (client image control data). The image customization processing 1100 also obtains image control data from the web server (server image control data). Next, a decision 1106 determines whether the image control data from the web browser includes a user request. If the image control data from the web browser does include a user request, a decision 1107 determines whether the user request is for an author's preference. If not, the file size for the determined image file is set 1108 to user-size, which indicate that the file size is set by a user's choice- or expected choice. On the other hand, if the decision block 1107 determines that the user request is for the author's preference, then the file size is set 1110 to the author-size, which is the file size recommended by the author of the image.

In the case in which the decision block 1106 determines that there is no user request within the image control data from the web browser, the file size is set 1112 to default-size, which is the default size for the image file. Following blocks 1108, 1110 and 1112, a decision 1114 determines whether the file size that has been selected is greater than a maximum file size (server-Size) that the web server is willing to transmit. The server-size is primarily Influenced by control information from the web server itself, but can also be influenced by the image control information from the web browser. In any case, if the file size is greater that the server size, then the file size is set 1116 to server-size. Thus, blocks 1114 and 1116 combine to limit the file size to the server-size, which is the maximum file size that the web server is willing to support. As an example, if the web server is experiencing a heavy load, the web server can reduce the amount of data it needs to transmit to requesting web browsers by lowering the server-size.

Next, following block 1116 or following the decision block 1114 when the file size is not greater than the server-Size, the image format for the graphical image is determined 1118. The image format can be determined 1118 based on various criteria, including: (i) compression techniques available at both the web browser and the web server, (ii) printer formats (e.g., raster, Postscript, bit map, etc.), (iii) display formats, (iv) size of image, and/or (v) a vector (outline) representation of the image. These criteria as well as user preferences are passed to the web server during the handshake processing 400, 414. Hence, the image customization processing 1100 is intelligent enough to select a compression technique that is supportable on both image browser and the web server. In fact, there might be a particular preference for a compression technique set by a user or author or server which could be preferably selected or given some priority. Also, depending on whether the graphical image is to be displayed or printer by the user, the image customization processing 1100 selects the appropriate format. The determining 1118 of the image format can also compare various compression techniques and then selecting the one which yields the smallest amount of data yet still has the necessary image quality. When the user intends to use the graphical image file for display on a display device, the format includes a display format suitable for the display device associated with the web browser (e.g., client machine 302), such as RGB, raster, vector and the like. Alternatively, when the user intends to use the graphic image of printing on a printer, such as a laser printer, the format includes a printer format suitable for the printer associated with the web browser (e.g., client machine 302), such as dithered, CMYK, or RTL for plotting.

In any event image data is retrieved 1120 in accordance with the determined image format and the determined file size. Following block 1120 the image customization processing 1100 is completed and processing then returns to block 1010 of the web server processing 1000.

If it later turns out that the amount of data (determined image format and/or file size) are not sufficient for a better quality image, physical size or resolution that is then requested, addition data can be transmitted so that the image can be displayed or printed at the greater quality, resolution and/or physical size. The data transmitted can be the entire amount of needed data or just the incremental amount of data.

The client image control data can, for example, include two basic types of data: user data and client system data. The user data includes, for example, user preference, intended use, and a specific quality level request. The intended use, for example, is for display or for printing a particular size graphical image. The user preference could be a user selected choice of quality versus size for image files or something that is predicted for the user. The client system data, for L)@ample, includes compression schemes supported by the client and server, transmission performance data, equipment information. The transmission performance data may include nominal transmission speeds (e.g., modem speeds) and measured transmission speeds. The equipment data may include a display format (e.g., display resolution) or a printer format (300 dpi) of equipment associated with the client machine. The server image control author data and server system data. The author data includes, for example, the author's preference for the image within the image file. Since the author created the image, the author may want to have some input into the quality levels for which the image can be displayed or otherwise used by users. The input from the author can be performed as detailed in FIG. 12 below.

The server system data can, for example, identify the compression scheme supported by the server machine and transmission performance of the server including nominal transmission speed and measured transmission speed.

Figure 12:
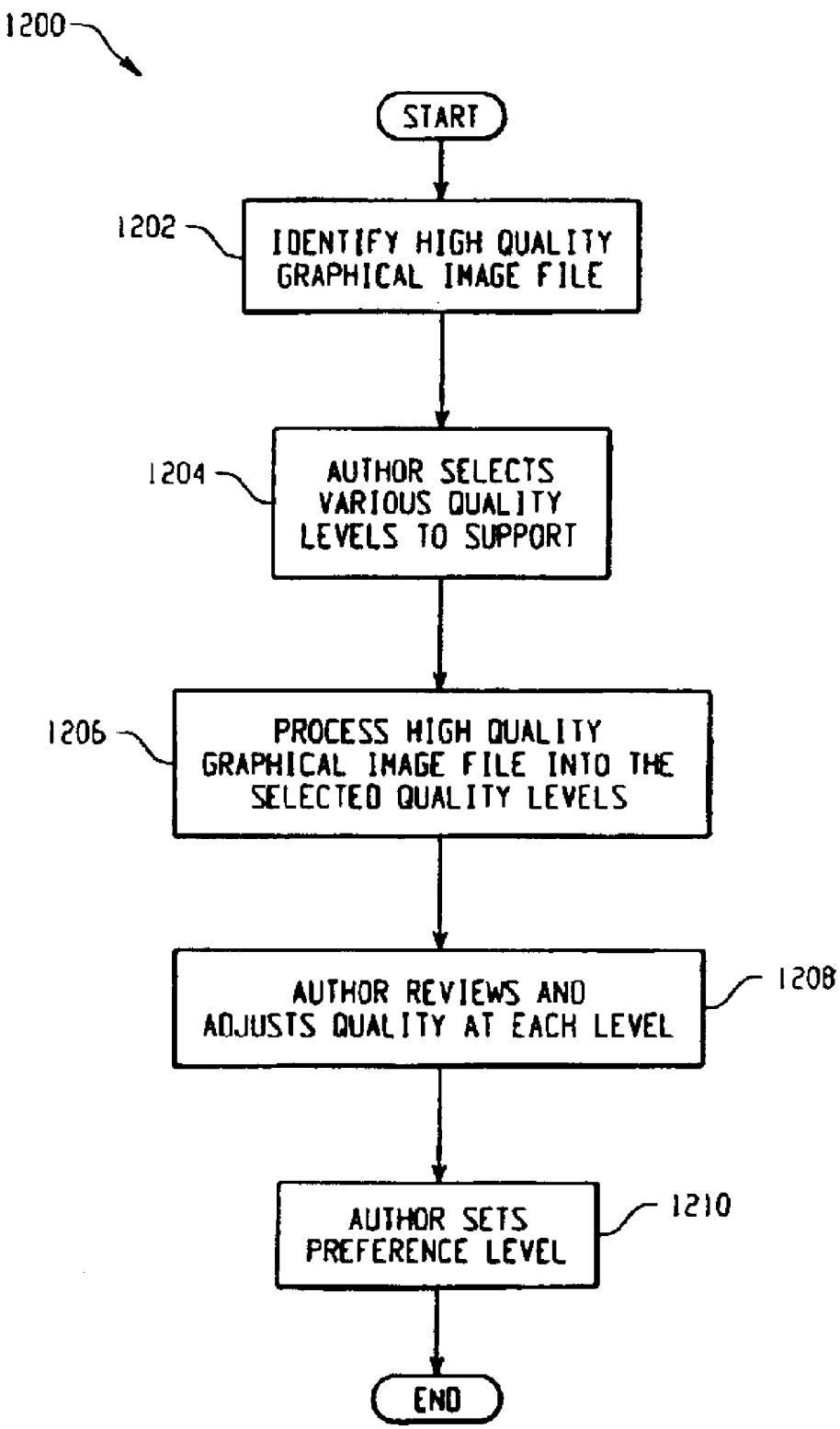
FIG. 12 is a flow diagram of author image processing.

FIG. 12 is a flow diagram of author image processing 1200. The author image processing 1200 is preferably performed on a computer system. The computer system need not be the client or the server machine. The author image processing 1200 initially identifies 1202 a high quality graphical image file to process. The author is preferably the creator of the image stored within the graphical image file but could be any other individual. Next, the author selects 1204 various quality levels that are to be supported. The quality levels could, for example, follow from those indicated in Table 1 or alternatively could be based on different levels of use. The different levels of use could, for example, correspond to client side equipment, namely modem speed (14.4, 28.8, ISDN) or output device resolution. Following block 1204, the high quality graphical image file is processed 1206 into the selected quality levels so that the image data associated with each of the selected quality levels is identified. Next, the author is given the opportunity to review and adjust 1208 the quality of the images produced at each of the levels. For example, the various images of the selected quality levels could be displayed on a display device to the author who would then increase or decrease quality levels as deemed appropriate given the nature of the particular image. The author could also view the image at different sizes. Thereafter, the author can set 1210 an author's preference level which may become part the server image control data as an indicator of the quality level and/or size the author prefers those requesting the image to obtain.

Much of the discussion of the invention provided above assumed that the client initiates the operations with the server. For example, in the client handshake processing 400 illustrated in FIG. 4A, the client begins the handshake processing with the server. Many alternative configurations are possible. A first alternative is that the server could initiate the handshake processing 400, 414 with a client (e.g., whenever it beings communicating with a client). The server would in this situation send it server control information to the client. The client would then determine the appropriate amount and/or format for the image data to be transmitted. Then the client would send a request for the image data to the server with an indicator of the amount of data and/or format to be transmitted. The server upon receiving the request then transmits the appropriate amount of image data in the appropriate format. A second alternative is that the handshake processing 400, 414 could also be merged with some or all of the client and server processing 700, 800. For example, the client handshake processing 400 could also send the client image control information during the handshake processing 400 and/or the server handshake processing 414 could also predetermine size versus quality tradeoffs available. Hence, it should be clear from the foregoing that the handshake and customization operations of the invention can be performed in a wide variety of different ways, with different organizations, and with different sequences.

The invention can also be embodied as computer readable code on a computer readable media. The computer readable media is any data storage device that can store data which can be thereafter be read by a computer system. Examples of the computer readably media include read-only memory, random-access memory, CD-ROMs, magnetic tape, optical data storage devices. The computer readable media can also be distributed over a network coupled computer systems so that the computer readable code is stored in a distributed fashion.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transmitting images comprising:
    (a) storing an image at a first image data level on a web server;
    (b) receiving a request over a communications network for said image from a client machine wherein said request contains client image control data;
    (c) negotiating between said client machine and said web server to determine a second image data level based on said client image control data; and
    (d) transmitting said image at said second image data level from said web server to said client machine.

2. The method of claim 1 wherein said client control data comprises user data.

3. The method of claim 1 wherein said client control data comprises client system data.

4. The method of claim 1 wherein said negotiating determines the amount of data contained in said second image data level.

5. The method of claim 1 wherein said negotiating determines the format of data contained in said second image level.

6. The method of claim 1 wherein said communications network is a wireless network.

7. The method of claim 1 wherein said communications network is a wired network.

8. The method of claim 1 wherein said communications network is a combination of a wireless network and a wired network.

9. The method of claim 1 wherein said image is stored in multiple sections which represent different selectable levels of quality.

10. A communications system to access the Internet comprising:
    (a) a web server containing an image at a first image data level;
    (b) a client machine capable of supporting a second image data level of said image; and
    (c) a server machine for negotiating to determine said second image data level of said image upon a request from said client machine for said image.

11. The system of claim 10 wherein said server machine contains client image control data.

12. The system of claim 11 wherein said server machine negotiates to determine said second image data level based on said client image control data.

13. The system of claim 10 wherein said second image data level contains less data than said first image data level.

14. The system of claim 10 wherein said client information comprises user data.

15. The system of claim 10 wherein said client information comprises client system data.

16. The system of claim 10 wherein said client machine contains a web browser.

17. A program embodied on computer readable media for determining an image data level to transmit to a client machine comprising:

(a) a code segment for storing client information on a server machine;

(b) a code segment for negotiating between a client machine and a web server containing an image at a first data level to determine a second image data level supported by said client machine; and (c) a code segment for transmitting said image at said second image data level from said web server to said client machine.

18. A program embodied on a computer readable medium recited in claim 17 further comprising a code segment for encoding said image at said second image data level prior to transmission.

19. A program embodied on a computer readable medium recited in claim 17 further comprising a code segment for compressing said image at said image data level.

20. A program embodied on a computer readable medium recited in claim 17 wherein said client information comprises client system data.

21. A program embodied on a computer readable medium recited in claim 17 wherein said client information comprises user data.

22. A method for transmitting images comprising:

(a) storing an image at a first image quality on a web server;

(b) receiving a request from a client machine over a network for said image, wherein said request contains client image control data;

(c) negotiating a quality/size tradeoff between said client machine and said web server to determine a second image quality; and (d) transmitting said image at said second image quality from said web server to said client machine.

23. The method of claim 22 wherein said client control data comprises user data.

24. The method of claim 22 wherein said client control data comprises client system data.

25. The method of claim 22 wherein said negotiating determines the amount of data contained in said second image data level.

26. The method of claim 22 wherein said negotiating determines the format of data contained in said second image level.

27. The method of claim 22 wherein said communications network is a wireless network.

28. The method of claim 22 wherein said communications network is a wired network.

29. The method of claim 22 wherein said communications network is a combination of a wireless network and a wired network.

30. The method of claim 22 wherein said image is stored in multiple sections which represent different selectable levels of quality.

* * * * *